Nov. 12, 1929.   F. E. GOODALL ET AL   1,735,610
APPARATUS FOR TREATING FLUIDS WITH ULTRA VIOLET LIGHT
Filed Oct. 25, 1926   3 Sheets-Sheet 1
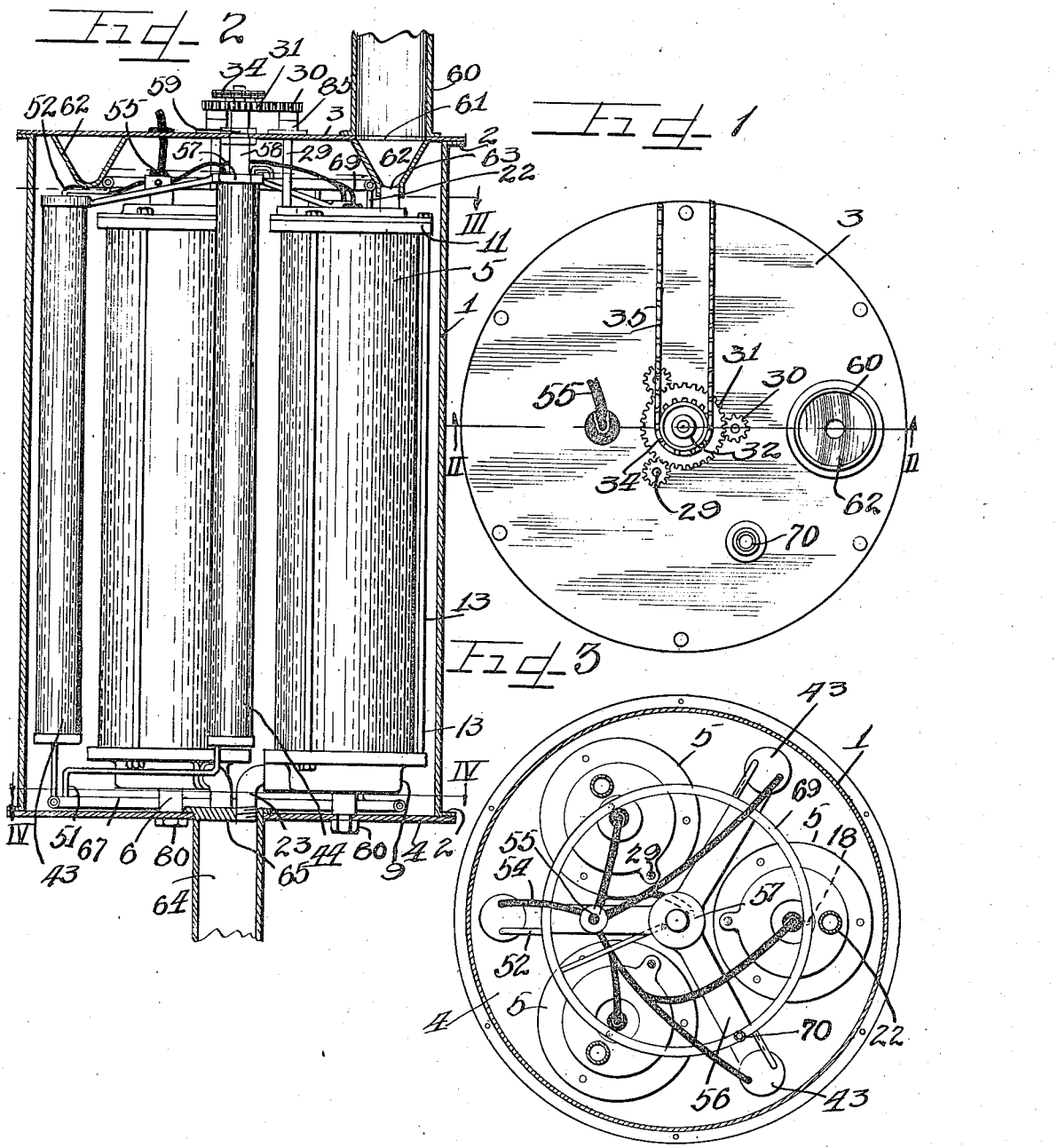

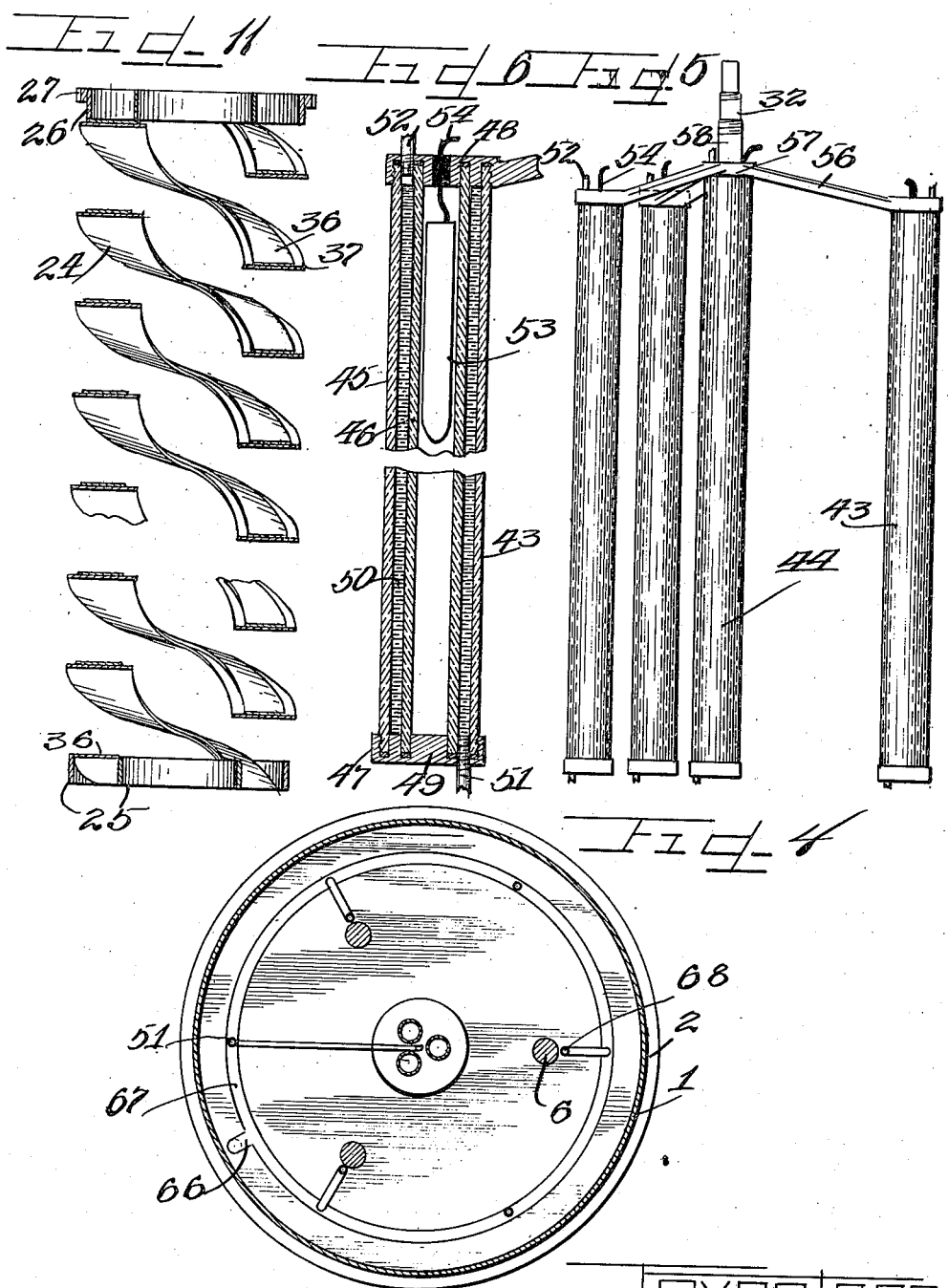

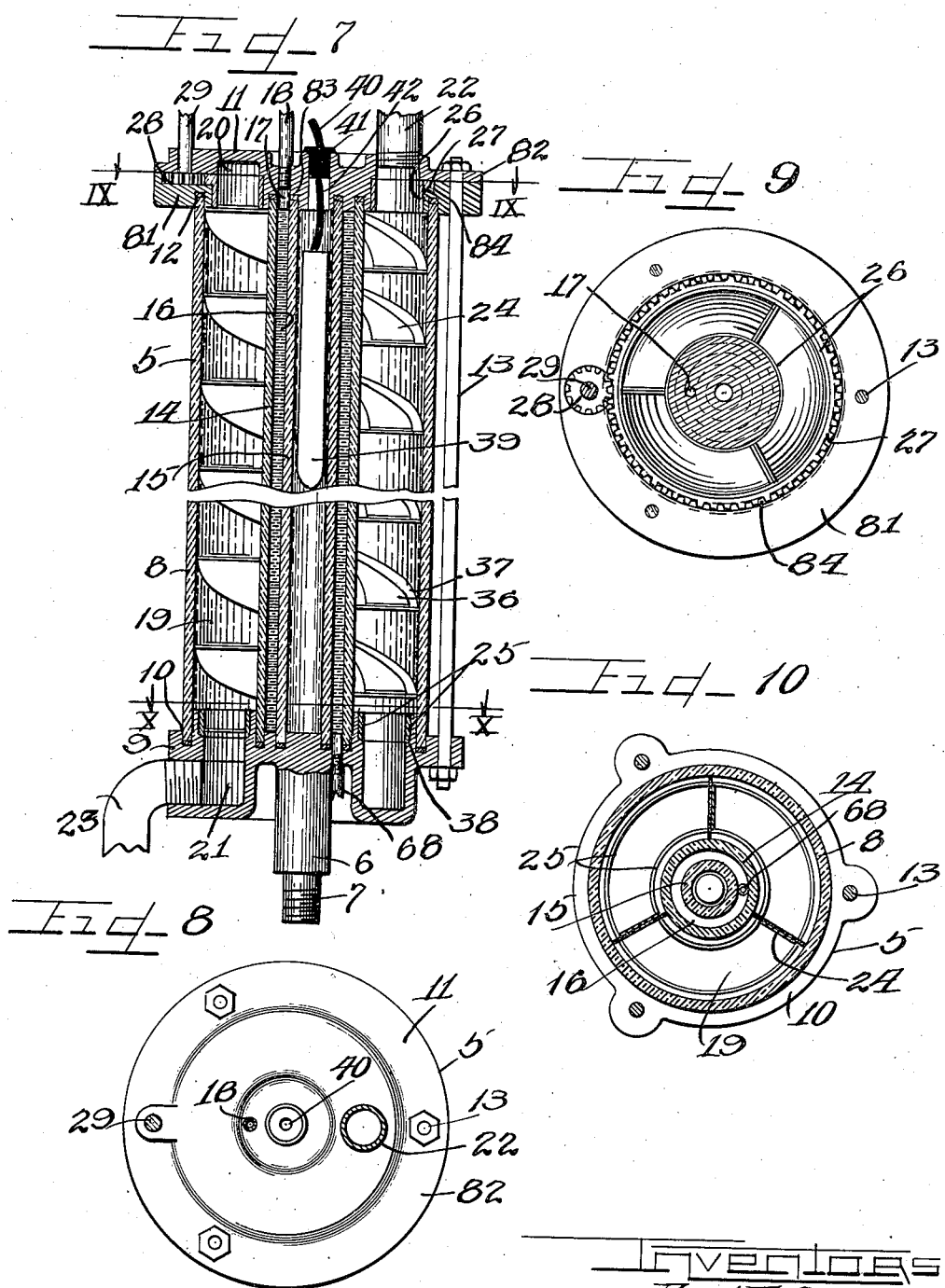

Patented Nov. 12, 1929

1,735,610

UNITED STATES PATENT OFFICE

FRED E. GOODALL AND ROBERT H. VAN SANT, OF CHICAGO, ILLINOIS

APPARATUS FOR TREATING FLUIDS WITH ULTRA-VIOLET LIGHT

Application filed October 25, 1926. Serial No. 144,144.

This invention relates to a process and apparatus for treating fluids with ultra-violet light.

In the attempt to treat fluids and more particularly liquid foods with ultra-violet light, it has been found that the effectiveness of the treatment is increased in accordance with the proximity of the source of light to the fluid under treatment. It has also been noted that where the rays of ultra-violet light strike the surface of the fluid to be treated normal to said surface, the penetration of the rays is much greater than where the light strikes at an angle less than normal. One of the difficulties, however, of treatment with ultra-violet light at close range, and, as has been found desirable, in a confined space, is to dissipate the large amount of heat generated by the ultra-violet lamps.

It is therefore an object of this invention to provide a method and apparatus for treating fluids with ultra-violet light at close range and within a confined space wherein means are provided for preventing the fluid treated from becoming heated by heat radiated from the source of ultra-violet light.

It is a further object of this invention to provide a process and apparatus for treating fluids with ultra-violet light in a light confining chamber at close range, whereby the fluid is exposed to the direct intense and normal rays of the ultra-violet light.

It is a further object of this invention to provide an apparatus for treating fluids with ultra-violet light wherein a relatively deep layer of fluid is subjected to the full and direct action of ultra-violet light acting from opposite directions and at close range normal to the surface of the fluid, the fluid during treatment being continuously maintained under agitation at a relatively low temperature.

Other objects and advantages of this invention will be apparent from the disclosures in the specification and the accompanying drawings.

This invention (in a preferred form) is illustrated in the drawings and hereinafter more fully described.

On the drawings:

Figure 1 is a top plan view of a device embodying the principles of our invention.

Figure 2 is a sectional view taken on line II—II of Figure 1.

Figure 3 is a sectional view taken on line III—III of Figure 2.

Figure 4 is a sectional view taken on line IV—IV of Figure 2.

Figure 5 is an elevational view, with parts removed, showing the distribution of jacketed ultra-violet lamps.

Figure 6 is an enlarged longitudinal sectional view of one of said lamps.

Figure 7 is a longitudinal sectional view of one of the fluid treating units.

Figure 8 is a top plan view of the same.

Figure 9 is a sectional view taken on line IX—IX of Figure 7.

Figure 10 is a sectional view taken on line X—X of Figure 7.

Figure 11 is a broken longitudinal sectional view of the agitating means in one of said units.

As shown on the drawings:

The reference numeral 1 indicates an outer cylindrical casing having flanged ends 2 to which are bolted or otherwise secured end plates 3 and 4 to form a closed container. Said casing is preferably formed of metal with a polished, reflecting inner surface. Within said container are mounted a plurality of units 5 in which a fluid to be treated is subjected to the action of ultra-violet light. Said units 5, which are symmetrically spaced within the container and as here shown are three in number, are supported from the lower end plate 4 by means of studs 6 having reduced threaded ends 7 adapted to extend through said plate 4 and to be secured to said end plate 4 by nuts 80. Each of said units 5 comprises a vertical outer cylinder 8 (Figures 7 to 11 inclusive) formed of quartz or other material transparent to ultra-violet light, a lower head 9 having a groove 10 in which said cylinder 5 is adapted to be positioned and an upper head 11 similarly grooved for receiving the upper end of said cylinder 8. Suitable packing 12 may be positioned in the bottom of said grooves 10 to form a water tight joint between the cylinder 8 and the heads 9 and 11. Said heads 9 and 11 are adapted to be held together by means of tie rods 13. A pair of concentric quartz cylinders 14 and 15 are similarly positioned with their ends secured in the heads 9 and 11. The upper head 11, as will be noted, is formed in two parts, a lower ring portion 81, for securing the end of the quartz shell 8 and an upper portion 82 adapted to fit over said lower ring portion 81, and to be held thereto by the tie rods 13. Said upper head portion 82 is provided with grooves 83 for receiving the ends of the inner concentric shells 14 and 15. Said cylinders 14 and 15 are spaced apart to form a relatively shallow annular chamber 16 through which a cooling fluid is adapted to be circulated. For this purpose the lower head 9 is provided with a fluid inlet passage into which there is threaded a pipe 68. Similarly the upper portion 82 of the head 11 is provided with an outlet passage 17 communicating the said annular chamber or jack 16, said passage 17 being threaded to receive a fluid conduit 18. In like manner, the quartz cylinders 8 and 14 form therebetween an annular chamber 19 through which the fluid to be treated is circulated. Said chamber 19 communicates at the top and bottom with annular grooves 20 and 21 formed in the upper head portion 82 and the lower head 9 respectively. Pipes 22 and 23 are provided as an inlet and outlet respectively, for fluid entering the chamber 19.

In order to provide positive circulating means for the fluid to be treated, helical vanes 24 are positioned within the chamber 19, said vanes 24 being rigidly secured to lower concentric bearing rings 25 and upper concentric rings 26. The outer one of said rings 26 is provided with an outer annular gear 27 adapted to fit within a recess 84 formed for the purpose in the head portion 81. Said vanes 24 are driven through the gear 27 and a small pinion gear 28 meshing therewith and mounted upon a stub shaft 29. Said stub shaft 29 extends vertically through the upper portion 82 of the head 11 and the upper end plate 3. The upper projecting end of said stub shaft 29 is journalled in a collar 85 mounted on said plate 3 and is provided with a small pinion gear 30 (Figures 1 and 2). Said pinion gear 30 in turn meshes with a larger gear 31 mounted upon a hollow shaft 32. Said shaft 32 also carries a sprocket gear 34 adapted to be driven by means of a chain 35 from any suitable source of power. The circulating means in each of the units 5 is driven from the common driving pinion 31.

The helical vanes 24 (Figure 11) are preferably formed of flat metal bands 36 to the surfaces of which are secured flexible strips 37 of relatively greater width adapted to serve as wipers for the concentric cylinders 8 and 14. The purpose of said wiping strips 37 is to prevent the accumulation of a crust over the surfaces of said cylinders 8 and 14 and also to prevent the formation thereon of relatively stationary films of the fluid to be treated. The vanes 24, as before mentioned, are secured, as by brazing, to upper and lower sets of rings or collars 26 and 25. Said lower rings 25 are adapted to bear against shoulders 38 provided for the purpose in the lower head 9.

In each of the units 5, within the inner quartz shell 15, there is axially suspended a source of ultra-violet light, such as a mercury quartz lamp 39. Lead wires 40 extend through an insulating plug 41 to said lamp 39 through a central passage 42 formed in the upper head portion 82. It is thus apparent that the ultra-violet light is radiated from the lamps 39 through the jacket of cooling fluid circulated between the concentric quartz shells 14 and 15. In general, the rays from said lamps 39 will be normal to the surface of the fluid to be treated. The object of the cooling jacket, is of course, to absorb the heat radiated from the ultra-violet lamps in order that the treated fluid and apparatus may not be unnecessarily heated. In many cases, such as in the treatment of oils, it will probably not be necessary to employ a cooling fluid at all in the units. The use of the cooling jackets is therefore optional, depending upon the nature of the material being treated.

In addition to the ultra-violet lamps positioned within each of the units 5, there are similar jacketed lamp units 43 symmetrically spaced with reference to said units 5. As here illustrated, there are four stationary units 43, three of said units being circumferentially positioned within the casing 1 and one of said units, 44, being positioned axially of said casing 1. Alternative arrangement of said units 43 would include means for revolving each unit 43 about one of the units 5. Each of said units 43 comprises (Figures 5 and 6) a pair of concentric quartz shells 45 and 46 secured at their respective ends within grooves 47 in upper and lower end plates 48 and 49 respectively. Each of said lower end plates 49 is provided with an inlet passage communicating with the annular chamber 50 formed by the concentric shells 45 and 46, said passage being threaded to receive a conduit 51 for admitting a cooling fluid to said chamber. The upper head 48 is similarly passaged to receive a conduit 52 for the effluent cooling fluid. A mercury quartz lamp 53 is suspended within each of the units 43. Lead wires 54 extend from said lamps 53 through the upper heads 48 to an electric current main 55. Each of the upper heads 48 is integrally connected by means of arms 56 radiating from the head 57 of the central unit 44. Said head 57 is rigidly secured to a hollow shaft 58 concentric with the shaft 32 and threaded to receive nuts 59 by means of which said shaft 58 is rigidly supported from the upper end plate 3.

As best seen from Figures 1 to 3 inclusive, the fluid to be treated is introduced into the apparatus by means of a pipe 60 registering with an aperture 61 in the top end plate 3. An annular trough 62 is secured to the underside of said end plate 3 so as to register with the aperture 61. Said trough 62 is provided with a plurality of bottom apertures 63 connected to the various intake pipes 22 for each of the units 5. After flowing through the units 5, the treated fluid is collected in a main conduit 64 joined with the bottom end plate 4 and provided with the apertured plug 65 for receiving the ends of the various pipes 23. The cooling fluid enters the apparatus through a pipe 66 (Figure 4) in the end plate 4 and passes into a distributor header 67. From said distributor header 67, short pipes 68 lead into the various units 5. The cooling fluid, which is preferably water, is led from the various units 5 by means of pipes 18 into a collecting conduit 69 from which a pipe 70 passes up through the top plate 3. The various units 43 are connected into the distributor header 67 by means of the pipes 51 and to the collecting pipe 69 by means of pipes 52.

The apparatus above described may be used in treating fluids such as water, edible oils, milk, and the like. As it is especially adapted for the sterilization of milk, its operation will be described in connection with that process. The milk in a fluid condition is admitted to the apparatus through the intake pipe 60, preferably being pumped under some pressure. From the pipe 60, the milk passes through the distributing trough 62 and pipes 22 into the various units 5. At the same time, water or other suitable cooling fluid is admitted through the pipe 66 to the distributor header 67 from whence it passes to the various units 5 and 43. Agitation of the milk is accomplished by means of the helical vanes 24 operated through the various gears 27, 28, 30, 31 and 34 and the sprocket chain 35. Each of the vanes 24 is provided with a wiping strip 37 which serves to prevent the formation of stationary films on the surface of the cylinders 14 and 15. The ultra-violet light radiating from the various mercury quartz lamps 39 passes through the cooling jackets provided by the concentric quartz cylinders containing the cooling fluid therebetween. The heating up of the milk is thereby prevented without substantially diminishing the efficiency of the ultra-violet rays, since quartz, as is well known, transmits ultra-violet light with very little loss. The action of the vanes 24 is to expose constantly new surfaces or layers of milk to the effect of the light, whereby it is possible to treat relatively deep layers of the milk.

Since the ultra-violet lamps 39 are disposed axially with respect to the concentric quartz shells in each of the units 5, the rays from said lamps are for the most part, all normal to the surface of the milk and therefore penetrate the milk most effectively.

The efficiency of the apparatus is further increased by the light units 43 spaced around the units 5. Not only is the milk thus exposed to the rays of the light both from the inside but also from outside of the milk layer. Since the outer casing 1 is preferably formed of metal or other material impenetrable by the ultra-violet rays, it will be appreciated that the entire force of the rays is spent within the apparatus and practically entirely in sterilizing the milk. The efficiency of the light treatment is further increased by the fact that the inner surface of the outer casing is high polished and therefore reflects the light back against the units 5 from every angle.

Since the milk is not heated during its passage through the apparatus, it is ready for shipment or storage as it leaves the same. This results in a marked economy over the present practice of sterilizing milk by pasteurization, in which the milk is heated and subsequently cooled. Results already obtained indicate that the bacteria count in ordinary raw milk may be reduced by more than 60% in a very short time by the use of apparatus such as described. In other words, the same degree of sterilization as now effected by pasteurization may be more quickly brought about by our process at a cost considerably less than the present cost of pasteurization.

We are aware that many changes may be made and numerous details of the construction may be varied through a wide range without departing from the principles of this invention, and we therefore do not purpose limiting the patent granted hereon, otherwise than necessitated by the prior art.

We claim as our invention:

1. An apparatus for treating fluids with ultra-violet light, comprising a pair of grooved heads, a plurality of concentric shells secured in the grooves of said heads and forming separate chambers, a source of ultra-violet light in the innermost chamber, means for conducting a cooling fluid to the intermediate chamber and means for conducting the fluid to be treated to the outer chamber.

2. An apparatus for treating fluids with ultra-violet light, comprising a closed container, a plurality of units therein each comprising hollow vessels through which the fluid is adapted to flow and an ultra-violet lamp within said hollow vessels and ultra violet lamps outside of said units but within said container.

3. An apparatus for treating fluids with ultra-violet light, comprising a closed container, a plurality of units therein each comprising hollow vessels through which the fluid is adapted to flow, an ultra-violet lamp within each of said hollow vessels and ultra-violet lamps outside of said units, but within said containers and cooling means interposed between each of said lamps and the fluid to be treated.

4. An apparatus for treating fluids with ultra-violet light, comprising a closed container, a plurality of receptacles therein for confining the fluid to be treated, sources of ultra-violet light disposed around said receptacles and cooling means for dissipating the heat generated by said light sources.

5. An apparatus for treating fluids with ultra-violet light, comprising a plurality of concentric shells having a source of ultra-violet light within the central shell and including intermediate quartz shells forming a chamber for a cooling fluid and an outer shell formed of material substantially impenetrable to ultra-violet rays.

6. An apparatus for treating fluids with ultra-violet light, comprising a plurality of concentric shells having a source of ultra-violet light within the central shell and including intermediate quartz shells forming a chamber for a cooling fluid and an outer shell confining a space for the fluid to be treated, and helical vanes rotatably mounted in said outer space for circulating said fluid.

In testimony whereof, we have hereunto subscribed our names.

FRED E. GOODALL.
ROBERT H. VAN SANT.